(12) United States Patent
Lummes et al.

(10) Patent No.: US 7,281,336 B2
(45) Date of Patent: Oct. 16, 2007

(54) TOUCH PROBE

(75) Inventors: Stephen Edward Lummes, Gloucestershire (GB); David Roberts McMurtry, Gloucestershire (GB)

(73) Assignee: Renishaw PLC, Gloucestershire (GB)

( * ) Notice: Subject to any disclaimer, the term of this patent is extended or adjusted under 35 U.S.C. 154(b) by 63 days.

(21) Appl. No.: 10/527,330

(22) PCT Filed: Sep. 5, 2003

(86) PCT No.: PCT/GB03/03863

§ 371 (c)(1),
(2), (4) Date: Mar. 10, 2005

(87) PCT Pub. No.: WO2004/025215

PCT Pub. Date: Mar. 25, 2004

(65) Prior Publication Data

US 2006/0162176 A1    Jul. 27, 2006

(30) Foreign Application Priority Data

Sep. 13, 2002   (GB) ................................. 0221255.3

(51) Int. Cl.
*G01B 5/00* (2006.01)
(52) U.S. Cl. .......................................... 33/503; 33/556
(58) Field of Classification Search ................. 33/503, 33/556, 558–561
See application file for complete search history.

(56) References Cited

U.S. PATENT DOCUMENTS

| 4,153,998 | A | | 5/1979 | McMurtry |
| 4,462,162 | A | | 7/1984 | McMurtry |
| 5,212,872 | A | * | 5/1993 | Spivey et al. ................. 33/558 |
| 5,339,535 | A | | 8/1994 | McMurtry et al. |
| 5,353,514 | A | | 10/1994 | McMurtry |
| 5,623,766 | A | | 4/1997 | Ruck et al. |
| 6,886,265 | B2 | * | 5/2005 | Fracheboud et al. .......... 33/559 |
| 7,024,783 | B2 | * | 4/2006 | Trull et al. ................... 33/503 |
| 7,055,258 | B2 | * | 6/2006 | Hajdukiewicz et al. ....... 33/559 |

FOREIGN PATENT DOCUMENTS

| EP | 0 967 455 A2 | 12/1999 |
| WO | WO 03/087708 A1 | 10/2003 |

OTHER PUBLICATIONS

Braddick, "Mechanical Design of Laboratory Apparatus," The Institute of Physics Monographs for Students, pp. 5-31, 1960.

* cited by examiner

*Primary Examiner*—Yaritza Guadalupe-McCall
(74) *Attorney, Agent, or Firm*—Oliff & Berridge, PLC

(57) ABSTRACT

A touch probe (10,50) is disclosed comprising a probe body (12,52) housing first locating elements (23,58), a stylus holder (16,54) having second locating elements (24,57) which co-operate with the first locating elements to locate the stylus holder within the probe body, and a bias (36,68, 86) to urge the first and second locating elements into contact, wherein an element (35,50,76,90) is provided to damp motion between the probe body and the stylus holder. The element may slow a relative movement between the locating elements perhaps by resisting the urging of the bias or absorb energy produced by a relative movement between the probe body and stylus holder. The element may be slidably or rotatably mounted with respect to one of the probe head and stylus holder.

13 Claims, 4 Drawing Sheets

TOUCH PROBE

The present invention relates to touch probes.

Touch probes having a stylus mounted in a seat within the probe and biased into the seat are known. When the stylus contacts a surface, through relative movement of the probe and the surface, the stylus is deflected from its seat against the action of the bias and this movement generates a signal which is passed to the machine so the machine can record the instantaneous position of the probe/surface.

The surface may belong to a workpiece whose dimensions are being measured or, to a tool which is used to shape a workpiece thus enabling adjustments, to take into account tool wear, to be made to a machine cycle.

In order to make accurate measurements, the stylus needs to be seated in a repeatable location within the probe called the neutral position. This can be achieved by supporting the stylus in a kinematic seat. An example of such a kinematic seat is described in U.S. Pat. No. 4,153,998 in which, the stylus is supported by three radially extending arms spaced at 120° around the axis of the stylus. The arms are supported on v notches produced by pairs of closely spaced balls which are fixed to the probe. A spring biases the arms into the v notches. The balls and arms form part of a circuit which is broken when the stylus is deflected. In an alternate measurement method, instead of using the kinematic seat itself to detect deflections, strain gauges may be located so as to detect movement from the neutral position. This is described in U.S. Pat. No. 4,462,162.

If the probe stylus is deflected and released suddenly, for example during a crash of the stylus into a surface or perhaps, a manual movement of the probe, the movement of the stylus with respect to the probe can cause shock loading of the kinematic seat when the stylus is biased back to the seated position by the spring. This can damage fragile parts of the measuring circuit.

According to the present invention there is provided a touch probe including a probe body housing first locating elements;

a stylus holder having second locating elements which co-operate with the first locating elements to locate the stylus holder within the probe body; and a bias to urge the first and second locating elements into contact, characterised in that, an element is provided to damp motion between the probe body and the stylus holder.

Preferably, the first locating elements each comprise a pair of balls which provide a v shaped seat and the second locating elements each comprise a roller which supports the stylus on the seat.

In a preferred embodiment the element slows a relative movement between the first and second locating elements.

Alternatively, the element absorbs energy produced by a relative movement between the probe body and stylus holder. An example is an element made from a material which exhibits hysteresis for example a rubber.

The invention will now be described, by way of example, with reference to the accompanying drawings, of which:

Figure 1:
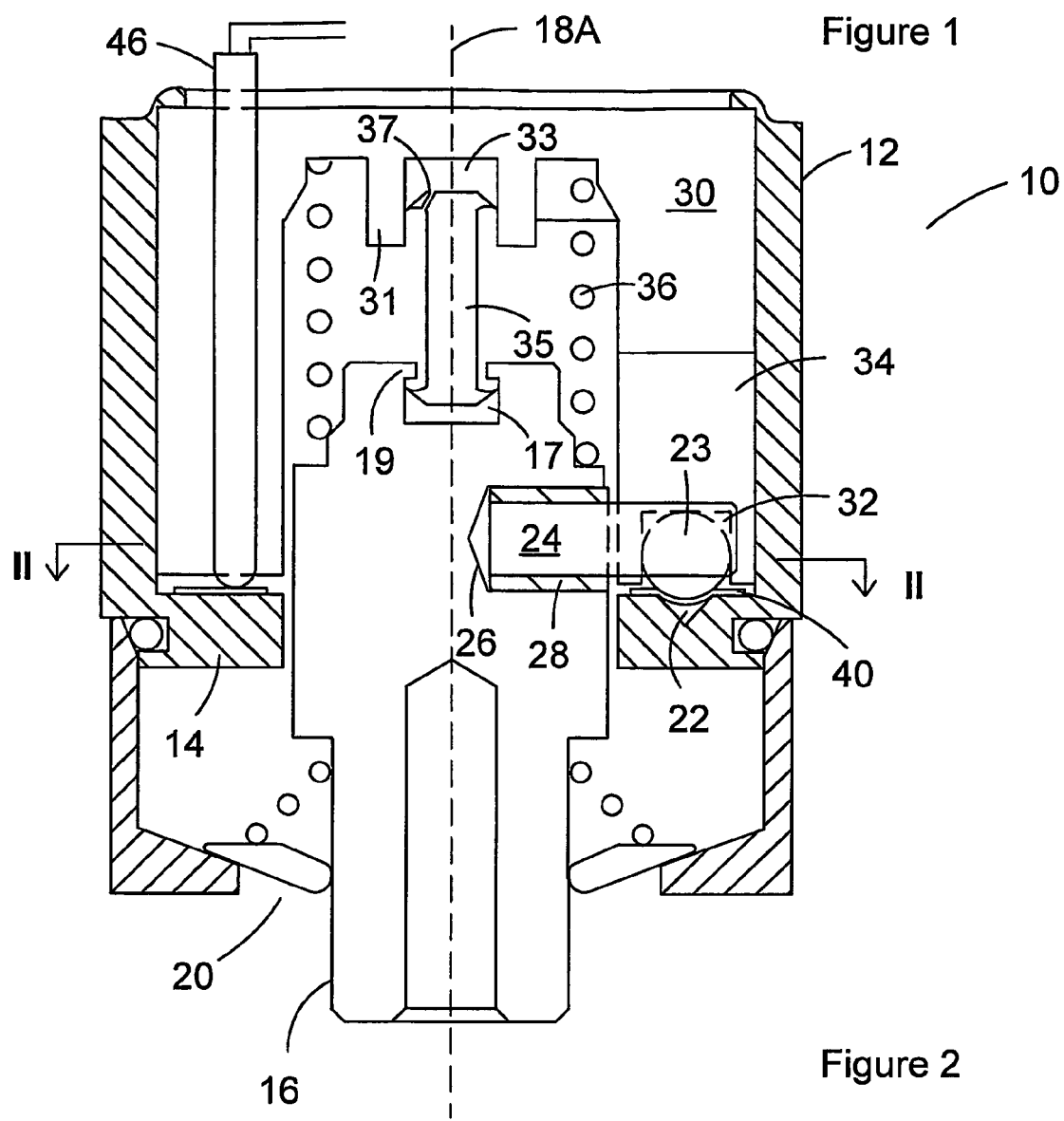
FIG. 1 is a cross-sectional view of a probe according to the invention.
Figure 3:
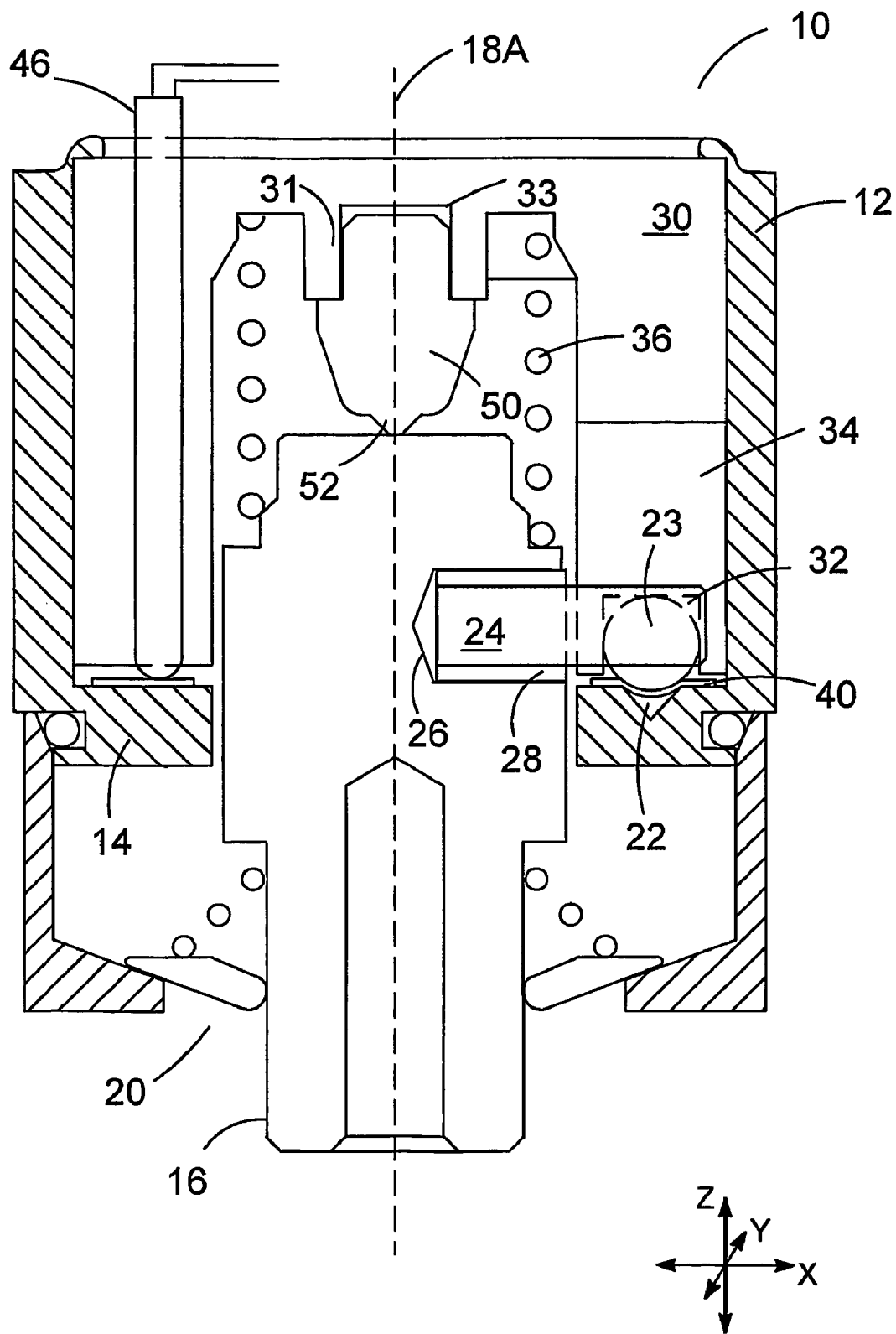
FIG. 3 is a cross-sectional view of a probe having an alternative insert according to the invention.

FIG. 1 and 3 show a probe 10 having an outer housing 12, preferably made of steel, and which has a radially inwardly directed annular flange 14. Mounted within the housing 12 is a stylus holder 16 to which a stylus (not shown) may be connected.

The stylus holder 16 protrudes from the housing 12 through an opening 20 for connection of a stylus and contacting of a workpiece or tool when relative movement takes place between the probe and the workpiece or tool.

Six recesses 22 are formed in the flange 14 and are open in the direction facing away from the opening 20. The recesses are arranged in pairs, and the pairs are spaced apart at 120° around the longitudinal axis of the probe 18A. The recesses are adapted to receive balls 23, and may be of any convenient shape for example conical or triangular, whereby when the ball is received in the recess it remains in a stable position and is kinematically supported. The spacing of the balls within each pair is such that they may be bridged by, and form a stable seating for, a roller 24 carried by the stylus holder 16.

The rollers 24 are fitted in holes 26 in the stylus holder spaced at 120° around the axis 18A, and the holes are initially lined with a plastic insert 28, which may be split along its length, and into which the rollers are pressed.

The balls are both located and clamped into their respective recesses by means of an open-ended cylindrical plug 30 made out of hard plastic. In the annular surface at its open end, the plug has six appropriately spaced recesses 32, which in the assembled probe, fit over the balls. Also, at its open end, the plug 30 is formed with three elongate slots 34 which act as guides for the rollers 24 as the stylus holder tilts and is moved vertically by forces acting on the end of the stylus.

The stylus holder is biased into a neutral position, when no force is applied to the stylus, by means of a spring 36 which produces a force in the direction of the axis 18A to urge the rollers into the seats formed between the balls 23.

In order to enable the probe to produce a signal when the stylus is deflected either by tilting or vertical movement, the balls are electrically connected in series to form a circuit which is completed by the rollers making contact with both balls in each pair.

Figure 2:
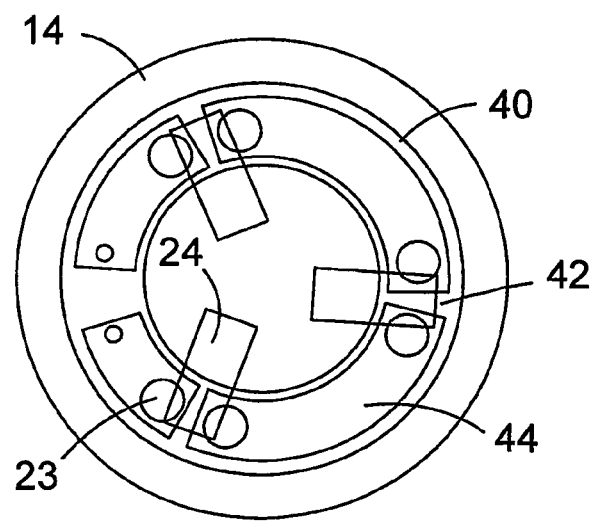
FIG. 2 is a cross-section on the line II-II of FIG. 1, of an assembled probe.

The balls are made from a hard electrically conducting material, for example steel or tungsten carbide, and they must therefore be insulated from the housing 12 where they make contact with the housing in the recesses 22. This is achieved using a thin flexible electrically conductive element 40 made of two layers (see FIG. 2). The first layer 42 is formed from an insulating material, and the second layer 44 is part-annular and formed from an electrically conductive material.

When the probe is assembled, the annular thin element is positioned on the annular flange 14 with its insulating side in contact with the conducting areas of the recesses 22. Two contact pins 46 contact opposite ends of the circuit completed by the balls, rollers and thin flexible element and, at their distal end, enable access to the circuit from outside the probe. The balls are received in the recesses 22 in the flange 14 and in the recesses 32 in the plug. The balls are electrically insulated from the flange by the thin flexible element 40. The thin flexible element 40 is deformed by the kinematically located balls. Various embodiments of this flexible element are described in EP0967455.

Referring now to FIG. 1, the plug 30 has a downwardly extending central portion 31 which lies inside the spring 36.

The central portion 31 has a recess 33 in which one end of a plastic insert 35 is slidably housed. The other end of the insert 35 is located within a recess 17 of the stylus holder 16 at the distal end of the stylus holder to that which protrudes from the opening 20 of the housing. Each end of the insert 35 has a flange which has a substantially similar diameter to the recess in which it is housed. The recess 17 in the stylus holder 16 has a lip 19 which prevents the insert 35 from being removed from stylus recess 17.

On a stylus deflection, the stylus holder 16 moves against the spring 36 pushing the insert 35 into the recess 33 of the plug 30 (and to a lesser degree into the stylus recess 17). When the force is removed, the spring 36 urges the stylus holder 16 back into its neutral position. The insert 35 resists the action of the spring 36 slowing the return of the stylus holder to its neutral position thus preventing damage, in this case, to the thin flexible element 40.

The flanges on each end of the insert 35 may be formed integrally with the rest of the insert or, for example from plastic skirts that are glued onto the insert. The insert may be made from any suitable plastic material, such as polypropylene, which is flexible enough to slide within the recess during a stylus deflection but stiff and tough enough that the flanges do not deform excessively or tear during the return of the stylus holder to its neutral position. The flanges form a seal in each recess 17, 33. If the seal is too complete then fluid would not be able to bleed around the edge of each flange thus preventing the spring 36 from returning the stylus holder to its neutral position. The flanges may thus be formed so as to provide bleed zones around their circumference or alternatively, one or more bleed holes 37 may be provided. The use of bleed holes is preferred as fluid flow may be controlled with greater accuracy.

Referring now to FIG. 3 which shows a probe 10 having an alternative insert 50. Insert 50 is manufactured from a material which exhibits hysteresis, in this case a fluorocarbon rubber. Rubbers which have large side chains exhibit greater losses than those with smaller side chains. The insert 50 is partially housed, at one end, within recess 33 of plug 30. At the other end, is formed a nipple 52 which just contacts the stylus holder 16 when the stylus holder is in its neutral position. This ensures that the kinematic location is substantially unaffected by the presence of the insert 50 and that the insert 50 has maximum energy absorbing effect when the stylus is triggered.

On a stylus (not shown) deflection, the stylus holder will tilt and/or move in the vertical (z) direction. The insert 50 is compressed by this movement and absorbs the energy. As insert 50 is made from a rubber, it exhibits hysteresis i.e. the compression of the rubber uses more energy than is released on subsequent relaxation of the rubber (the difference is mainly converted to heat). This effect may be enhanced by the use of a filler within the rubber. One suitable filler is carbon powder which converts some of the residual compression energy into heat as the compression of the rubber causes friction between different carbon powder particles. A suitable amount of carbon is between 10 and 120 parts per hundred (pph) and is preferably between 20 and 100 pph. The compression of the rubber inset 50 absorbs energy which would have otherwise compressed the spring 36. This means that there is less kinetic energy when the spring returns the stylus holder 16 to its neutral position. As the insert 50 converts a high proportion of the energy that it has removed from the system into heat (as it is lossy), it only contributes a small proportion of energy into returning the stylus holder to its neutral position thus, the impact of the rollers 24 on the balls 23 and thus on the flexible element 40 is reduced. Certain rubber materials have the extra benefit that they recover from a compression at a slow rate thus the release of this energy has a minimal, if any, contribution to the effect of releasing the spring and enabling the stylus holder to return to the neutral position. An example of such a rubber is Sorbothane. This not only reduces normal wear and tear on the probe parts, but can also prevent damage in an abnormal situation such as a crash of the stylus into an object.

More than one filler or other material can be added to the rubber to improve damping of the element.

The heat generated by the insert during deflections is not sufficient to cause any thermal distortions of the kinematic location or the probe or stylus. A heat sink, such as oil, could be used within the probe cavity to minimise such a risk and this would have the added advantage that the oil, being of higher viscosity than air, would aid the damping process.

The insert 50 could be replaced by a rubber ball. The geometry of the downwardly extending portion 31 of plug 30 would need to be changed in order to seat the ball correctly.

Alternatively, the insert could be manufactured from a compressible material which does not exhibit appreciable hysteresis and energy is removed from the system (the insert is made lossy) by use of a filler such as carbon. A suitable amount of carbon is between 10 and 120 pph of the compressible material and preferably between 20 and 100 pph.

The insert or ball 50 need not contact the stylus holder at all times. This would ensure that the kinematic locations were not in any way being affected by the damper. There could even be a gap between the insert and the stylus holder which may correspond to the size of a normal deflection for that particular probe, so the damping effect would then only be used in exceptional circumstances. This of course would reduce the effectiveness of a particular insert as it cannot absorb energy until it is being compressed and would also require that that insert were securely fixed in the recess to prevent removal therefrom during normal use of the probe.

The person skilled in the art will appreciate that a number of different materials show a hysteresis effect and that the proportion of energy absorbed is a function of the material used as well as any additives and the conditions of use. So, an insert can be tailored to suit particular circumstances without use of more than known material properties.

Figure 4:
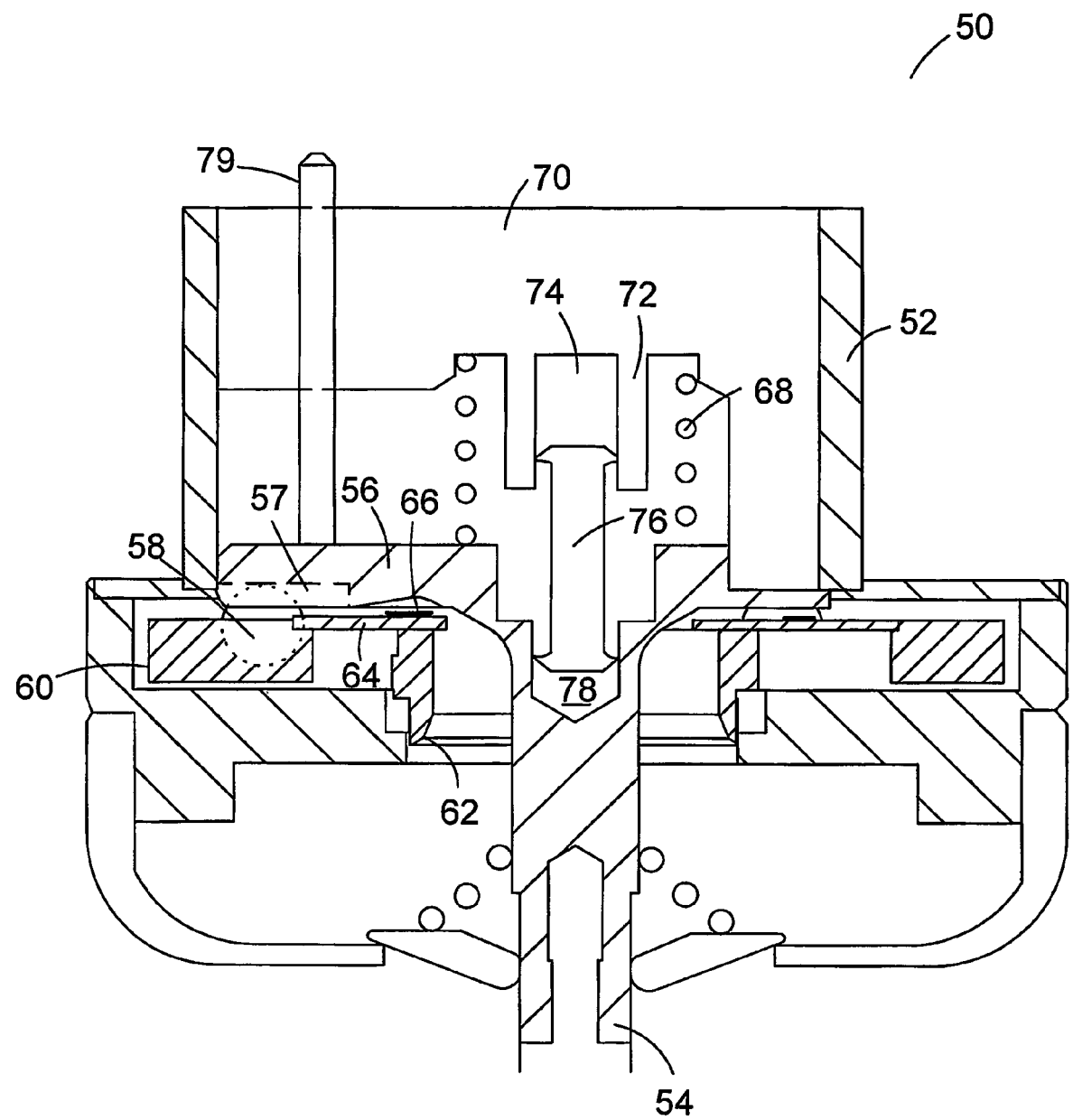
FIG. 4 is a cross-sectional view of an alternative probe according to the invention.

FIG. 4 is a cross-sectional view of an alternative probe 50 having a housing 52. A stylus holder 54 is kinematically located within the probe by three arms 56 which each have a v-shaped groove 57. Each v-shaped groove 57 partially houses one of three balls 58 mounted in the outer ring of a central boss 62. The stylus holder 54 is thus supported via the three arms 56 on the balls 58. Three webs 64 of material of reduced thickness connect the outer ring 60 to the central boss 62. The central boss 62 is rigidly fixed to the probe housing 52. Located on each of the webs 64, is a strain gauge 66. The v shaped grooves of the arms 56 are biased into contact with the balls 58 by a coil spring 68 which is retained in position within the probe housing 52 by a plastic plug 70. A damping insert 76 is retained within the spring 68 by, at a first end, a recess 74 in a downwardly extending portion 72 of the plastic plug 70 and, at the other end, by a recess 78 in the stylus holder 54.

When a stylus is deflected, the stylus holder 54 moves within the probe housing 52 against the action of the spring 68. The movement is detected by the strain gauges 66 as any change in loading on the outer ring 60 causes flexure of the thin webs of material 64. The webs of material 64 are each located adjacent a ball 58 making the strain gauges more sensitive to tilting movements. The signals from the strain gauges 66 are relayed back to a machine controller or machine interface via two contact pins 79 which provide electrical connection to the strain gauges.

In order to make the probe as sensitive and thus as accurate as possible, the webs of material 64 are as thin and narrow as possible. This however can lead to damage of the strain gauges as movement of the outer ring 60 with respect to the central boss 62 is magnified as the cross sectional area of the webs 64 is reduced. The probability of damage is increased when either high speed measurements are taking place or if the probe crashes into a surface.

To reduce the possibility of strain gauge damage, a damper, in the form of a plastic insert 76 is used to slow down the return movement of the stylus holder 54 to its neutral, or kinematically located position. The insert has a triangular profiled flange at each end which allows easy movement of the flange into its respective recess 74, 78 i.e. when there has been a stylus deflection and the spring 68 is being compressed. However, when the deflecting force is removed and the spring bias towards the neutral position returns, the flanges of the insert 76 resist this return movement resulting in a reduction in the speed and force of the return to the neutral position by the spring. So, if there has been a large stylus (and thus stylus holder) deflection or a high force impact the efficiency of the spring in returning the stylus holder to the neutral position is reduced.

Figure 5:
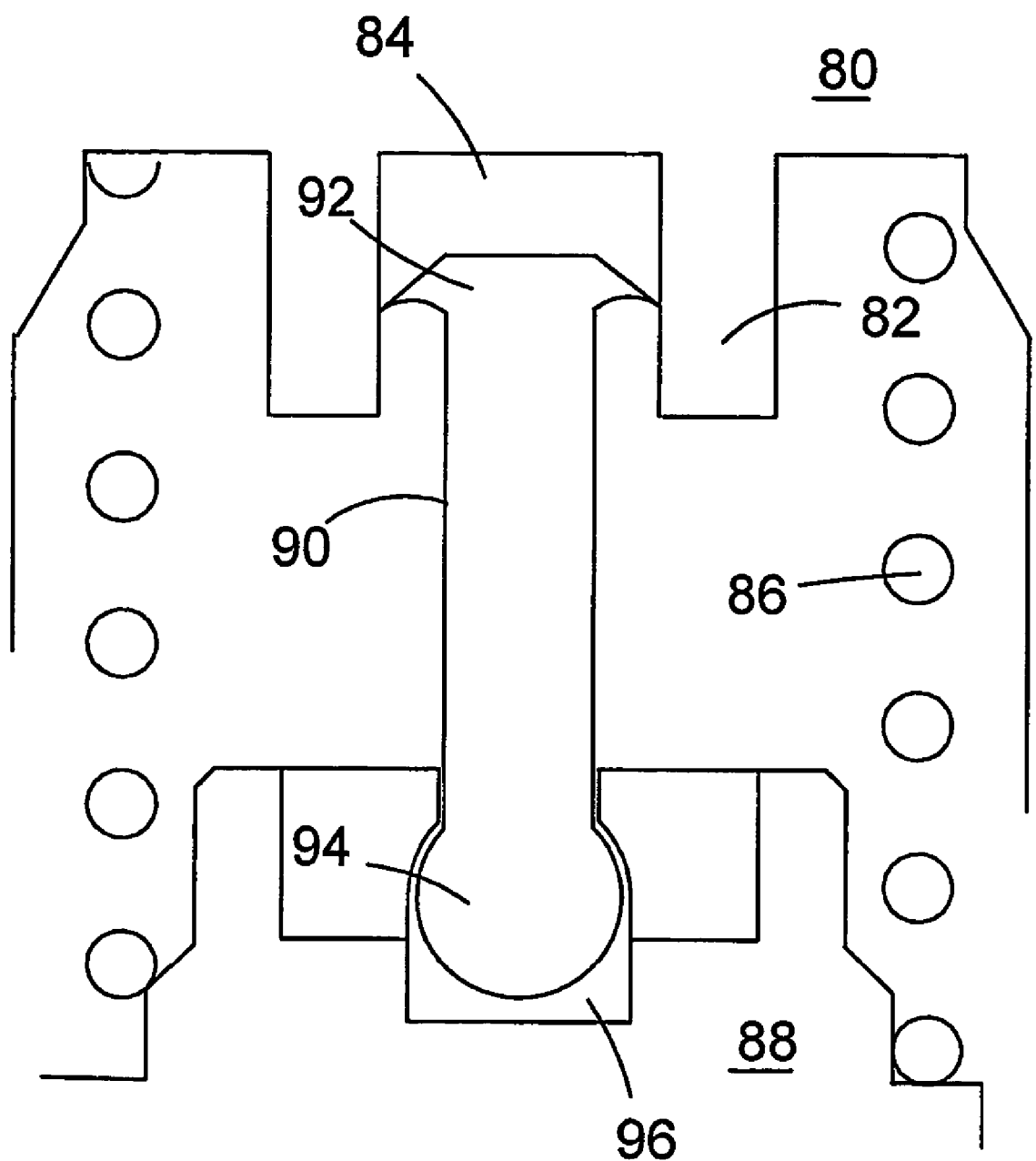
FIG. 5 is a cross-sectional view of an insert according to the invention.

FIG. 5 is a cross-sectional view of a further insert 90 according to the invention. A first end 92 of the insert 90 is slidably housed in a recess 84 within a downwardly extending portion 82 of a plastic plug 80 which is use would be housed within a probe (not shown). This first end 92 of the insert 90 has a flange which resists downward motion of the insert with respect to the recess 84. A second end of the insert 90 is a ball 94. The ball 94 is housed within a ball joint cavity 96 of a stylus holder 88 thus enabling rotational movement of the ball with respect to the cavity.

In kinematic positioning of one object with respect to another as described above, it is preferable that friction between the two parts of the kinematic joint is kept to a minimum. This means that forces that do not act along the longitudinal axis of the probe should be kept to a minimum. The use of a ball joint at one end of the insert enables smooth motion of the stylus holder with respect to the probe in a plane perpendicular to the probe axis. This assists not only as regards repeatability of the kinematic joint, but also by providing less resistance to off axis movement such as tilting of the stylus holder within the probe cavity thus helping to retain probe sensitivity.

The type of insert used within a probe is function of the type of probe and stylus and their characteristics. Some styli are designed to be contacted mainly in the x and y planes for example, a square or disc shaped stylus. In this case, the amount of overtravel required in the z-direction within the probe is limited as stylus deflections are generally in the xy plane. In this situation, either an energy absorbing insert or an insert that controls the return movement to the seated position can be utilised.

Overtravel is the space within the probe in which the stylus holder may move in the z-direction before contacting a part of the inside of the probe. For styli which are as likely to deflect in direction, such as star or ball shaped or in high speed scanning situations, more overtravel, to protect the probe from damage, is required. This gives more time between a deflection being registered and the probe stopping than a probe which has reduced overtravel. In these circumstances, the insert which controls the return movement is more suitable.

The kinematic locating elements described herein are preferred examples. Other formations may be used. Examples are given in 'Mechanical Design of Laboratory Apparatus' by H Braddick Chapman and Hall Ltd, London 1960.

The probes which have been described may be used in scanning or measuring objects for reproduction (coordinate measuring machine CMM) or measurement to check accuracy of a machining process (CMM or machine tool) or tool setting to account for tool wear when machining an object or with robots. Thus, the probes may be spindle mounted and movable with respect to an object, or machine bed mounted and fixed with respect to an object, or mounted on an arm which can be removably located within the working volume of the machine (for example on a lathe).

The invention claimed is:

1. A touch probe comprising:
a probe body housing first locating elements;
a stylus holder having second locating elements which co-operate with the first locating elements to locate the stylus holder within the probe body; and
a bias to urge the first and second locating elements into contact, wherein a damping element is provided to damp motion between the probe body and the stylus holder.

2. A touch probe according to claim 1 wherein said damping element slows a relative movement between the first and second locating elements.

3. A touch probe according to claim 2 wherein said damping element slows the relative movement by resisting the urging of the bias.

4. A touch probe according to claim 1 wherein said damping element is slidably mounted with respect to one of the probe head and stylus holder.

5. A touch probe according to claim 4 wherein said damping element is slidably mounted with respect to both the probe head and stylus holder.

6. A touch probe according to claim 4 wherein said damping element is rotatably mounted with respect to one of the probe head and stylus holder.

7. A touch probe according to claim 1 wherein said damping element absorbs energy produced by a relative movement between the probe body and stylus holder.

8. A touch probe according to claim 7 wherein said damping element is lossy.

9. A touch probe according to claim 8 wherein said damping element includes at least two materials and at least one of which is lossy.

10. A touch probe according to claim 9 wherein the lossy material is carbon powder.

11. A touch probe according to claim 10 wherein between 10 and 120 pph of carbon powder is used.

12. A touch probe according to claim 1 wherein, the first locating elements each comprise a pair of balls which form a v-shaped seat and the second locating elements each comprise a roller which supports the stylus holder on the v-shaped seat.

13. A touch probe according to claim 1 wherein, the first locating elements each comprise a ball and the second locating elements each comprise a v shaped groove which partially houses a ball and is supported thereon.

* * * * *